US009412070B2

(12) United States Patent
Bostick et al.

(10) Patent No.: US 9,412,070 B2
(45) Date of Patent: Aug. 9, 2016

(54) AUTOMATICALLY DERIVING CONTEXT WHEN EXTRACTING A BUSINESS RULE

(71) Applicant: International Business Machines Corporation, Armonk, NY (US)

(72) Inventors: James E. Bostick, Cedar Park, TX (US); John M. Ganci, Jr., Cary, NC (US); Paul E. Hensler, Endicott, NY (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 14/050,577

(22) Filed: Oct. 10, 2013

(65) Prior Publication Data

US 2015/0106309 A1 Apr. 16, 2015

(51) Int. Cl.
*G06N 5/02* (2006.01)
*G06N 5/04* (2006.01)

(52) U.S. Cl.
CPC ....................... *G06N 5/025* (2013.01)

(58) Field of Classification Search
None
See application file for complete search history.

(56) References Cited

U.S. PATENT DOCUMENTS

| 6,389,588 | B1* | 5/2002 | Wadhwa | G06F 8/74 717/106 |
|---|---|---|---|---|
| 7,020,869 | B2 | 3/2006 | Abrari et al. | |
| 7,448,048 | B1 | 11/2008 | Nesamoney et al. | |
| 2007/0214100 | A1* | 9/2007 | Marfatia | G06F 8/51 706/20 |
| 2008/0140696 | A1* | 6/2008 | Mathuria | G06F 17/30315 |
| 2008/0177689 | A1 | 7/2008 | Jeng et al. | |
| 2008/0306986 | A1* | 12/2008 | Doyle, Sr. | G06Q 10/10 |
| 2012/0041921 | A1 | 2/2012 | Canaday et al. | |
| 2012/0102002 | A1* | 4/2012 | Sathyanarayana | G06F 17/30303 707/687 |
| 2013/0159036 | A1 | 6/2013 | Keil et al. | |
| 2014/0101124 | A1* | 4/2014 | Scriffignano | G06F 17/30864 707/706 |
| 2014/0282373 | A1* | 9/2014 | Garza | G06F 8/74 717/106 |
| 2014/0282396 | A1* | 9/2014 | Manjarekar | G06F 8/74 717/120 |

OTHER PUBLICATIONS

Cibran et al., Aspect-Oriented Programming for Connecting Business Rules, Business Information Systems—BIS, 2003, 10 pages.
Charfi et al., Hybrid Web Service Composition: Business Processes Meet Business Rules, ICSOC '04, Nov. 15-19, 2004, copyright 2004 ACM 1-58113-871-7/4/0011, pp. 30-38.
Kam Hou Vat, A Context-Based Organization Modeling for e-Learning Initiatives, 2003, 5 pages.

* cited by examiner

*Primary Examiner* — Kakali Chaki
*Assistant Examiner* — Eric Nilsson
(74) *Attorney, Agent, or Firm* — Schmeiser, Olsen & Watts, LLP; Matthew Chung

(57) ABSTRACT

A method and associated system for automatically deriving context of a business rule that is being inferred from an information source, such as legacy computer-program source code, a system specification, or a description of a business function or operation. A first generation of context-dependent conditions upon the business rule is identified by analyzing the information source and other, related, sources, and the business rule is modified to account for this first generation of context-dependent conditions. Context-dependent conditions that place constraints upon the previously identified first-generation conditions are then identified and the business rule is further modified to account for this next generation of context-dependent conditions. This process repeats iteratively through multiple generations of identifications, until the business rule has been modified to accommodate all contextual information that may be gleaned from all analyzed information sources. These sources may include extrinsic sources like Web pages, standards, or public documents.

17 Claims, 3 Drawing Sheets

AUTOMATICALLY DERIVING CONTEXT WHEN EXTRACTING A BUSINESS RULE

FIELD

The present invention relates to automatically inferring business rules from legacy business systems.

BACKGROUND

It is possible to infer a business rule from source code of a legacy computer program or from an other information source associated with a business function. But such an inferred rule will be incomplete if the process by which it is inferred cannot detect boundary conditions, conditional constraints, and other factors that depend upon the context of the rule within the business.

BRIEF SUMMARY

A first embodiment of the present invention provides a method for automatically deriving a context of a business rule when extracting the business rule from an information source, wherein a context of the business rule indicates an association between the business rule and a context-dependent characteristic of the business rule, the method comprising:

a processor of a computer system inferring the business rule as a function of a first element of information, wherein the first element of information is comprised by a first information source;

the processor identifying a second element of information that is associated with a first context of the first element of information, wherein the first context indicates an association between the first element and a context-dependent characteristic of the first element, and wherein the second element of information is comprised by a second information source; and the processor modifying the business rule as a function of the second element of information.

A second embodiment of the present invention provides a computer program product, comprising a computer-readable hardware storage device having a computer-readable program code stored therein, said program code configured to be executed by a processor of a computer system to implement a method for automatically deriving a context of a business rule when extracting the business rule from an information source, wherein a context of the business rule indicates an association between the business rule and a context-dependent characteristic of the business rule, the method comprising:

the processor inferring the business rule as a function of a first element of information, wherein the first element of information is comprised by a first information source;

the processor identifying a second element of information that is associated with a first context of the first element of information, wherein the first context indicates an association between the first element and a context-dependent characteristic of the first element, and wherein the second element of information is comprised by a second information source;

the processor modifying the business rule as a function of the second element of information.

A third embodiment of the present invention provides a computer system comprising a processor, a memory coupled to said processor, and a computer-readable hardware storage device coupled to said processor, said storage device containing program code configured to be run by said processor via the memory to implement a method for automatically deriving a context of a business rule when extracting the business rule from an information source, wherein a context of the business rule indicates an association between the business rule and a context-dependent characteristic of the business rule, the method comprising:

the processor inferring the business rule as a function of a first element of information, wherein the first element of information is comprised by a first information source;

the processor identifying a second element of information that is associated with a first context of the first element of information, wherein the first context indicates an association between the first element and a context-dependent characteristic of the first element, and wherein the second element of information is comprised by a second information source;

the processor modifying the business rule as a function of the second element of information.

DETAILED DESCRIPTION

It is possible to infer or otherwise identify a business rule by analyzing one or more information sources comprised by a legacy business system. Such a legacy system may comprise a combination of computer programs, source code listings, procedures, workflows, data structures, data models, business-process models, ontologies, infrastructure descriptions, conventions, standards, procedures, and other formal or informal information sources that directly or indirectly describe a characteristic of a business function or of an other operation associated with a business, a business rule, or a context of a business rule.

Inferred or otherwise identified business rules may be used for many purposes, such as building a business-process model; developing, updating, or maintaining a software application; performing a marketing, operational, financial, or other type of analytical function; or documenting a business function or other operation associated with a business.

Identifying a business rule in this manner may be a straightforward process that uses techniques known to those skilled in the art of compiler design, user-interface design, analytics, or other relevant arts. Such a procedure may, for example, infer a simple business rule:

Increase Balance Due by 8%.

by ascribing meaning to keywords and operators in a computer source-code statement:

COMPUTE BALANCE-DUE=BALANCE-DUE*1.08

Such a rule, however, lacks factors that might have been detected by considering the context of the source-code statement. These factors may, for example, identify: a condition that determines if or when the Balance Due is increased by 8%; a computation by which the Balance Due is derived prior to being increased by 8%; a constraint on the types of billings that may be included in the Balance Due; or a convention that determines how to round off the adjusted value of the Balance Due. Many such context-dependent factors are possible, none of which are identified by considering only the single computer source-code statement.

Figure 1:
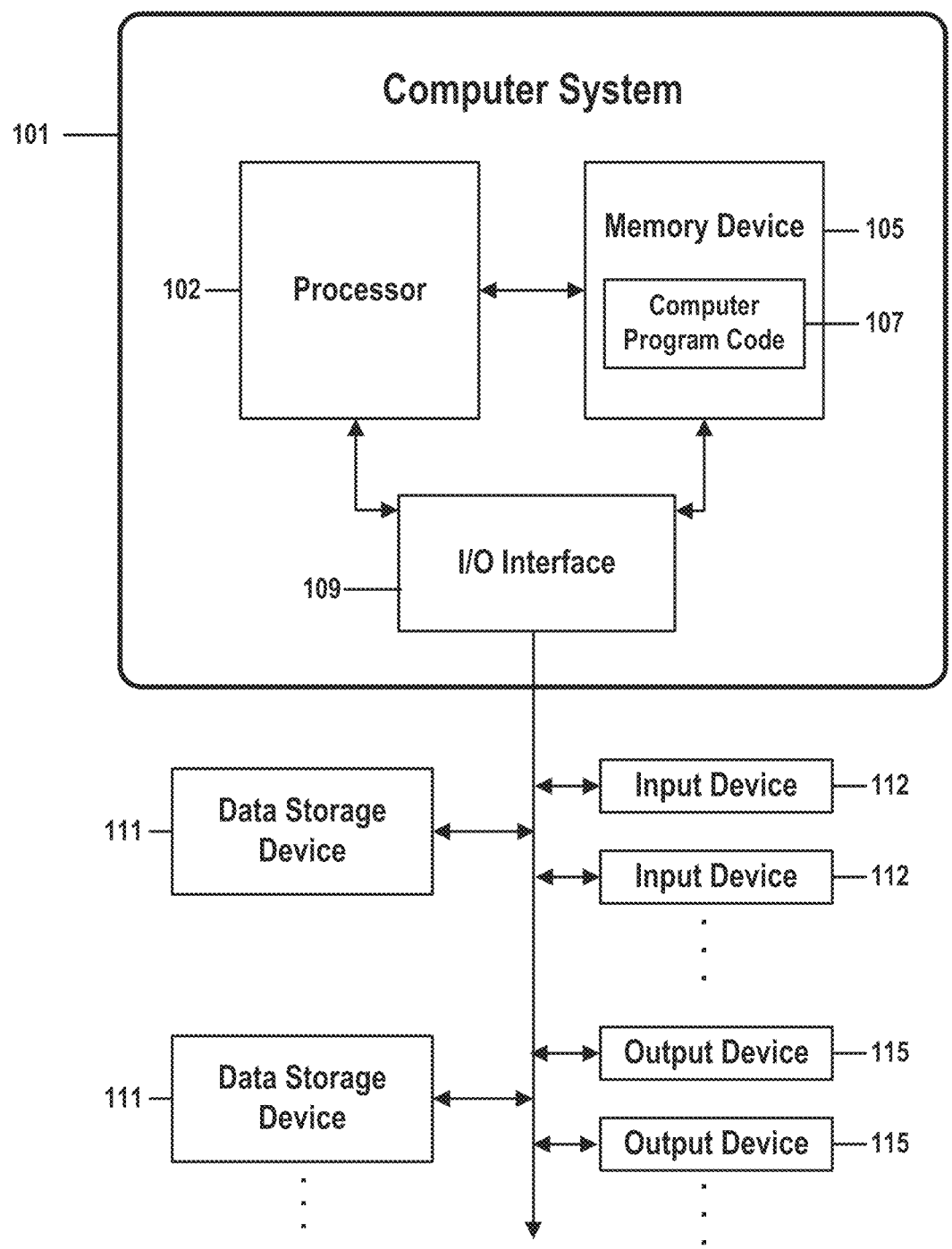
FIG. 1 shows a structure of a computer system and computer program code that may be used to implement a method for deriving context when extracting business rules in accordance with embodiments of the present invention.
Figure 2:
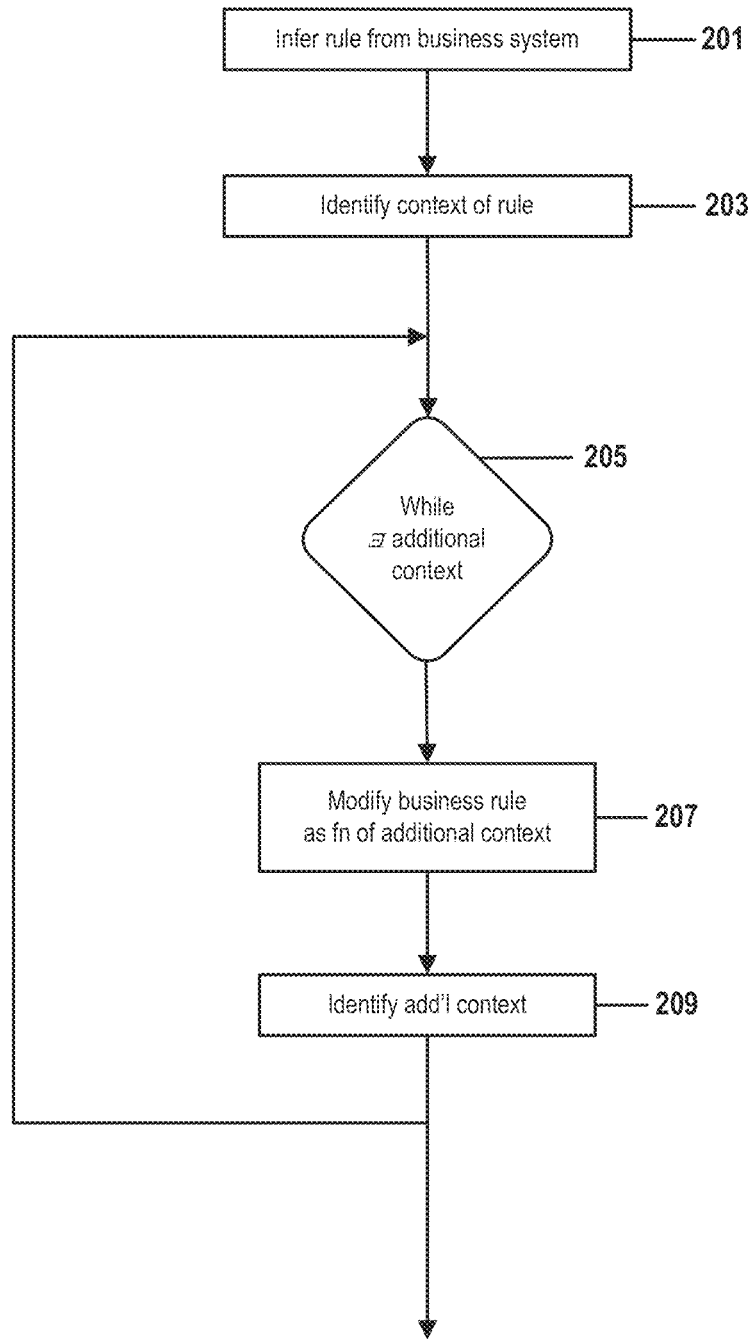
FIG. 2 is a flow chart that illustrates steps of a method for deriving context when extracting business rules in accordance with embodiments of the present invention.
Figure 3:
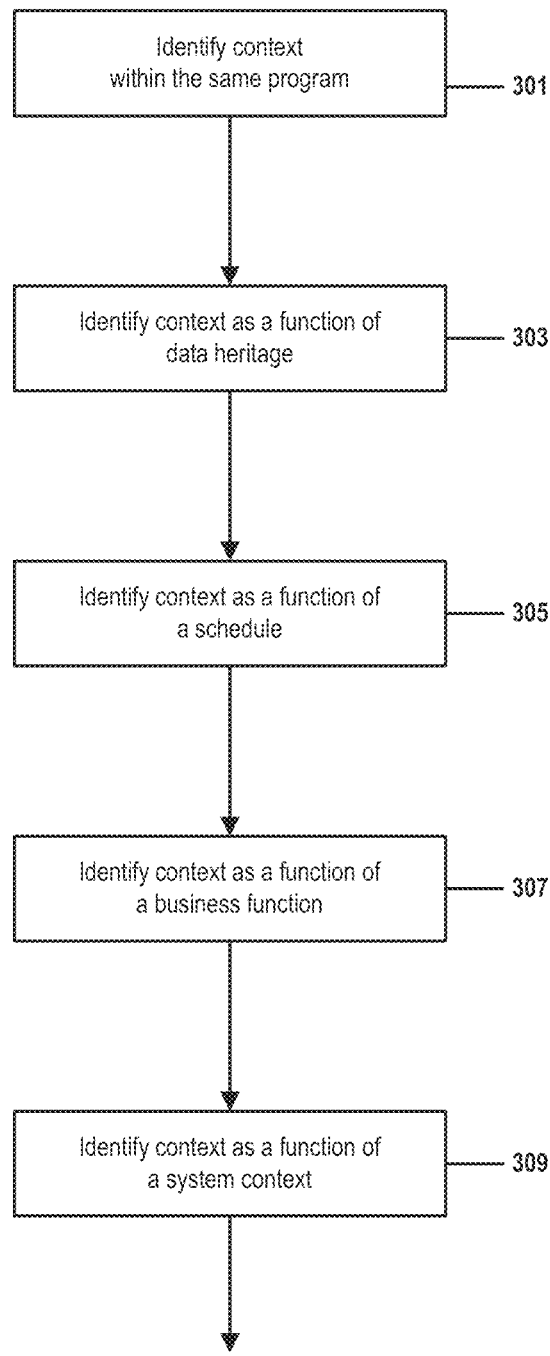
FIG. 3 is a flowchart that illustrates a sequence of steps by which embodiments of the present invention may identify one or more contexts and one or more context-dependent elements of information associated with the one or more identified contexts.

Methods and systems of the present invention address this issue by identifying and analyzing context of an inferred business rule when inferring the business rule from an existing information source. FIGS. 1-3 illustrate embodiments of these methods and systems.

Methods in conformance with embodiments of the present invention may comprise other variations of the method of FIGS. 1-3. Examples cited in this document are for illustrative purposes only and are not meant to limit embodiments of the present invention to characteristics specific to those examples.

FIG. 1 shows a structure of a computer system and computer program code that may be used to implement a method for deriving context when extracting business rules in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, in one embodiment, the present invention may take the form of a computer program product comprising one or more physically tangible (e.g., hardware) computer-readable medium(s) or devices having computer-readable program code stored therein, said program code configured to be executed by a processor of a computer system to implement the methods of the present invention. In one embodiment, the physically tangible computer readable medium(s) and/or device(s) (e.g., hardware media and/or devices) that store said program code, said program code implementing methods of the present invention, do not comprise a signal generally, or a transitory signal in particular.

Any combination of one or more computer-readable medium(s) or devices may be used. The computer-readable medium may be a computer-readable signal medium or a computer-readable storage medium. The computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium or device may include the following: an electrical connection, a portable computer diskette, a hard disk, a random access memory (RAM), a read-only memory (ROM), an erasable programmable read-only memory (EPROM or flash memory), Radio Frequency Identification tag, a portable compact disc read-only memory (CD-ROM), an optical storage device, a magnetic storage device, or any suitable combination of the foregoing. In the context of this document, a computer-readable storage medium may be any physically tangible medium or hardware device that can contain or store a program for use by or in connection with an instruction execution system, apparatus, or device.

A computer-readable signal medium may include a propagated data signal with computer-readable program code embodied therein, for example, a broadcast radio signal or digital data traveling through an Ethernet cable. Such a propagated signal may take any of a variety of forms, including, but not limited to, electro-magnetic signals, optical pulses, modulation of a carrier signal, or any combination thereof.

Program code embodied on a computer-readable medium may be transmitted using any appropriate medium, including but not limited to wireless communications media, optical fiber cable, electrically conductive cable, radio-frequency or infrared electromagnetic transmission, etc., or any suitable combination of the foregoing.

Computer program code for carrying out operations for aspects of the present invention may be written in any combination of one or more programming languages, including, but not limited to programming languages like Java, Smalltalk, and C++, and one or more scripting languages, including, but not limited to, scripting languages like JavaScript, Perl, and PHP. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), a wide area network (WAN), an intranet, an extranet, or an enterprise network that may comprise combinations of LANs, WANs, intranets, and extranets, or the connection may be made to an external computer (for example, through the Internet using an Internet Service Provider).

Aspects of the present invention are described above and below with reference to flowchart illustrations and/or block diagrams of methods, apparatus (systems) and computer program products according to embodiments of the present invention. It will be understood that each block of the flowchart illustrations, block diagrams, and combinations of blocks in the flowchart illustrations and/or block diagrams of FIGS. 1-3 can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks.

These computer program instructions may also be stored in a computer-readable medium that can direct a computer, other programmable data-processing apparatus, or other devices to function in a particular manner, such that the instructions stored in the computer-readable medium produce an article of manufacture, including instructions that implement the function/act specified in the flowchart and/or block diagram block or blocks.

The computer program instructions may also be loaded onto a computer, other programmable data-processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

The flowchart illustrations and/or block diagrams FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, wherein the module, segment, or portion of code comprises one or more executable instructions for implementing one or more specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special-purpose hardware-based systems that perform the specified functions or acts, or combinations of special-purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for deriving context when extracting business rules in accordance with embodiments of the present invention, and may implement other embodiments described in this specification, including the methods illustrated in FIGS. 1-3. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for deriving context when extracting business rules.

Any of the components of the present invention could be created, integrated, hosted, maintained, deployed, managed, serviced, supported, etc. by a service provider who offers to facilitate a method for deriving context when extracting business rules. Thus the present invention discloses a process for deploying or integrating computing infrastructure, comprising integrating computer-readable code into the computer system 101, wherein the code in combination with the computer system 101 is capable of performing a method for deriving context when extracting business rules.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

While it is understood that program code 107 for deriving context when extracting business rules may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for deriving context when extracting business rules is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

FIG. 2 is a flow chart that illustrates steps of a method for deriving context when extracting business rules in accordance with embodiments of the present invention. FIG. 2 comprises steps 201-209. Embodiments of steps 203 and 209 are described in greater detail by FIG. 3.

In Step 201, an embodiment of the present invention infers or extracts a business rule from a first information source using means known now or in the future to those skilled in the art. As described above, the first information source comprises, but is not limited to, a combination of computer programs, source code listings, procedures, workflows, data structures, data models, business-process models, ontologies, infrastructure descriptions, conventions, standards, procedures, and other formal or informal information sources that directly or indirectly describe a characteristic of a business function or of an other operation associated with a business, a business rule, or a context of a business rule.

This procedure translates information inferred from the first information source into a natural-language statement or into a formal representation of a business rule. It may be performed by a human translator or through an automated process that infers meaning to contents of the first information source. In some embodiments, the procedure may use a technique known to those skilled in the art of compiler design, user-interface design, artificial intelligence, analytics, or an other relevant field to identify meaningful information comprised by a statement by parsing tokens or other elements of the statement.

If the method of step 201 fails to identify information that may be used to infer or otherwise identify a business rule, then the method of the embodiment ends without performing further steps of FIG. 2 or of FIG. 3.

In step 203, embodiments of the present invention identify one or more context-dependent elements of information associated with one or more context-dependent characteristics of the business rule identified in step 201. Each element of the one or more context-dependent elements may be comprised by one or more information sources that may include the first information source.

Each of these context-dependent elements of information may identify or otherwise be associated with a condition upon the performance or scope of the business rule; may associate the business rule with a characteristic of an other entity of information; may identify a characteristic of an other information source associated with the business rule; may identify a relationship, such as a dependency, between a characteristic of the business rule and an other entity of information; or may otherwise identify or suggest a factor that might modify a function or other characteristic of the business rule.

In one set of examples, wherein an information source comprises a first statement of a first block of computer source code, embodiments of the present invention may, in step 203 or in analogous step 209, identify a context of the first statement, or of a business rule inferred from the first statement, by considering one or more factors comprising:

an element of data that is processed by the first statement a condition upon how or when the first statement is performed an identification of a unit of source code that comprises the first statement a second statement, comprised by a second block of computer source code, that references the first block of computer source code, along with any conditional scope governing the second statement or the second block of computer source code a condition upon how or when a computer program is performed, wherein the computer program comprises the first block of computer source code or the second block of computer source code an association with an other abstract construct, such as a software application, a group of software applications, a specification, a set of requirements, a topology, a data model, a data structure, or an other type of information source.

Embodiments of the present invention may identify other types of context-dependent elements of information in a similar manner by considering other components of the first information source or of an other information source, wherein the other components are related to or are otherwise associated with the first statement.

As will be described below in the description of analogous step 209, this process may be performed iteratively, with each iteration of step 209 identifying a next level of context-dependent elements of information, wherein a next element of the next level of context-dependent is related to or associated with a context-dependent element identified in a previous iteration of step 203 or step 209.

In other words, just as step 203 may identify a first element of information that is associated with a first context of the business rule identified in step 201, a first iteration of step 209, through a similar procedure, may next identify a second element of information that is associated with a second context of the first element; a second iteration of step 209 may identify a third element that is associated with a third context of the second element; a third iteration of step 209 may identify a fourth element that is associated with a fourth context of the third element; and so forth, until no more elements or context can be identified.

A context may be identified as a function of factors that may comprise, but are not limited to: the type of information source being analyzed; a format, purpose, or platform of a business rule; a design goal of the embodiment of the present invention; a business goal of the embodiment; or a technical or business constraint. The description of FIG. 3 below discusses representative procedures that may be employed by embodiments of the present invention in order to perform step 203.

In some cases, step 203 may not be able to identify context of a business rule. This may occur if, for example, the business rule is completely defined, or if an information source lacks even indirect reference to any context of the business rule. In such a case, as noted in the description of step 205, embodiments of the present invention may terminate.

In some cases, an embodiment of the present invention may, in step 203 or step 209, identify more than one context-dependent element of information associated with a context of a business rule. An embodiment may, for example, identify a program statement that places a condition on when the business rule may be performed, and may further identify a limit on the geographical source of data upon which the business rule may act. In such a case, the next iteration of step 209 would try to identify context-dependent elements associated with both the condition and the limit.

Step 205 initiates an iterative process that comprises steps 205-209 and that, as described above, continues until either step 203 or an iteration of step 209 is unable to identify any context-dependent element of information.

In step 207, embodiments of the present invention modify the business rule to place it in compliance with the associated context-dependent element of information identified in the more recent of either step 203 or the most recent iteration of step 209.

In the example above, if step 203 had identified a first context-dependent condition that the business rule of step 201 may be performed only during a monthly account closing, and had further identified a second context-dependent condition that the business rule may be performed only on balance-due data culled from transactions that have billing dates over than 90 days old, then the business rule of step 201 might be modified in the first iteration of step 207 to read:

"Increase Balance Due by 8% during monthly closings for all transactions aged more than 90 days."

In step 209, embodiments of the present invention attempt to identify one or more context-dependent elements of information that are associated with a context of a context-dependent element identified by the more recent of either step 203 or the most recent iteration of step 209. This procedure is described in greater detail in the discussion of step 203 above.

Consider, for example, a case wherein step 201 identifies a business rule and step 203 then further identifies a context-dependent element comprising a computer program that constrains the business rule to be performed only during a monthly account closing. Here, the first iteration of step 209 may further identify one or more second-level context-dependent elements that are associated with a context of the previously identified computer program. If such a second-level element is a deployment plan that limits the computer program to North American operations, then the business rule would be further modified, during the next iteration of step 207, to add this second-level context-dependent geographic limitation to the business rule, yielding:

"Increase Balance Due by 8% at monthly closings for all transactions performed in North America."

The next iteration of step 209 would then attempt to identify one or more third-level context-dependent elements that are associated with a context of the deployment plan second-level context-dependent element.

If at least one context-dependent element is identified in an iteration of step 209, another iteration of the iterative process of steps 205-209 is performed. This iterative process of steps 205-209 continues until an iteration of step 209 is unable to identify any context-dependent elements associated with a context of an element identified in a previous iteration, at which point, the embodiment of the present invention of FIG. 2 then ends.

Embodiments of the present invention thus end when it has modified the business rule of step 201 to incorporate all identifiable elements of information that are directly or indirectly associated with context of the business rule. At the completion of the method of FIG. 2, the business rule may have been augmented with factors and conditions that accommodate all possible direct and indirect contextual considerations that may be inferred from the original information source of from an additional or extrinsic information source associated with the original information source.

FIG. 3 is a flowchart that illustrates a sequence of steps by which embodiments of the present invention may identify one or more contexts and one or more context-dependent elements of information associated with the one or more identified contexts.

In embodiments of the present invention, steps 203 and 209 of FIG. 2 may comprise combinations of procedures described by steps 301-309, and may, as described below, comprise combinations of context-identifying procedures similar to those described by steps 301-309.

If a FIG. 3 illustrates an embodiment of the method of step 203, then steps 301-309 may identify one or more contexts, and one or more context-dependent elements associated with the one or more contexts, of a business rule identified in FIG. 2 step 201.

If a FIG. 3 illustrates an embodiment of the method of step 209, then steps 301-309 may identify one or more contexts, and one or more context-dependent elements associated with the one or more contexts, of a previously identified context-dependent element of information, wherein the previously identified element had been identified by the most recent iteration of either step 203 or step 209 of FIG. 2.

In embodiments of FIG. 3, all identified context is directly associated or indirectly associated (through one or more levels of previously identified context-dependent elements of information) with a business rule that was inferred from an information source in FIG. 2 step 201.

For illustrative purposes, the description of FIG. 3 will refer to a first information source that comprises a first program statement of a first computer program. But, as described above, the first information source may, in other embodiments, comprise one or more of any other types of information-bearing entities from which a business rule or context-dependent element of information may have been inferred, extracted, or otherwise identified.

In step 301, embodiments of the present invention attempt to identify context of the first information source that is further comprised by the first computer program. In other words, step 301 describes a procedure that attempts to identify context of an information element wherein the context and the element are part of the same computer application.

In one example, consider a case wherein a business rule or a component of a business rule had been inferred or otherwise identified from the first program statement of the first computer program. Here, the embodiment might then, in step 301, consider other statements comprised by the first computer program in order to identify a context-dependent element, such as a condition under which the first statement may be executed.

If, for example, a business rule:

Increase Balance Due by 8%.

had, in step 201, been inferred from a first statement in a first computer program:

COMPUTE BALANCE-DUE=BALANCE-DUE*1.08 then the method of step 301 might infer additional context from other statements in the first computer program:

```
IF ACCT-SUSPENDED <= TODAY
    COMPUTE BALANCE-DUE = BALANCE-DUE * 1.08
END-IF
```

Embodiments of the present invention might thus, in step 301, modify the business rule, as a function of these newly identified context-dependent element, to read:

If an account has been suspended,
then increase BalanceDue by 8%.

As with all steps of FIG. 3, this procedure may be generalized to methods that identify types of other context-dependent conditions upon a time, manner, or an other characteristic of the business rule.

After identifying a first context and context-dependent element, some embodiment of the method of step 301 may continue to analyze the first computer program in order to identify additional context of the first statement, or may continue to analyze the first computer program in order to identify context of the three-line block of source code listed above. Depending on implementation details, an embodiment may perform such analyses as part of the current iteration of step 301 or may perform this further analysis in a next iteration. Similar generalizations may be applied to methods of steps 303-309.

In either case, such a further analysis might, for example, either in the same or in an other iteration of step 301, infer context from yet an other block of code comprised by the first computer program, where that other block of code limits the original 8% BalanceDue adjustment to those transaction records associated with accounts that are both overdue and suspended.

Such an other block of code might read:

```
IF PAYMENT-DUE-DATE <= TODAY
  IF ACCT-SUSPENDED <= TODAY
    COMPUTE BALANCE-DUE = BALANCE-DUE * 1.08
  END-IF
END-IF
``` thus resulting in a further modified rule:
If an account is overdue and has been suspended,
then increase BalanceDue by 8%.

In step 303, embodiments of the present invention attempt to identify context as a function of a characteristic of a data element processed by the first statement. Such context may be used to refine or otherwise revise the previously inferred business rule as a function of the characteristic.

In our ongoing example, consider a case wherein the previously inferred business rule describes a function that is performed only upon sorted records selected from an input file INREC, and wherein a module FILTER.INREC forwards to the SORT utility only those records of INREC that are associated with an account that has been suspended for more than 90 days.

By means of code-analyzing techniques known to those skilled in the art, embodiments of the present invention may, in step 303, infer further context by analyzing source code that describes the sequence of operations of the FILTER.INREC and SORT utilities upon the data processed by the business rule. Many variations of such source code are possible and may be coded in any programming language, script, or other means known to those skilled in the art of software engineering or programming.

This further context may then be used to refine the business rule to read:
If an account is overdue and
has been suspended for more than 90 days,
then increase BalanceDue by 8%.

In step 305, embodiments of the present invention attempt to identify additional context as a function of an inferred schedule that determines when a functional component of the previously identified business rule may be performed. As with all other steps of FIG. 3, embodiments of the present invention may use such additional context to refine or otherwise revise the previously identified business rule.

In our ongoing example, consider a case in which the function of the program source code identified in step 303 is performed once at the end of each of a business's fiscal quarters. An embodiment of the present invention might, using techniques known to those skilled in the art, infer that such source code may be interpreted as a quarterly schedule and, using a novel feature of the present invention, might further infer that this quarterly schedule is related contextually to the previously inferred business rule. In other embodiments, other types of inferential or analytical techniques may be used to arrive at the same conclusion.

In our ongoing example, the block of source code identified in step 303 may be defined as a function INCBAL that is called by a script QTRCLOSE. One example of such source code might be:

```
QTRCLOSE
  IF (QTRMONTH=TRUE) THEN
    INCBAL
  END-IF
END QTRCLOSE
    ...
INCBAL
  IF PAYMENT-DUE-DATE <= TODAY
    IF ACCT-SUSPENDED <= TODAY
      COMPUTE BALANCE-DUE = BALANCE-DUE * 1.08
    END-IF
  END-IF
END INCBAL
```

The additional context inferred from this code would then allow the method of step 305 to further refine the business rule to read:
At the end of each fiscal quarter
if an account is overdue and
has been suspended for more than 90 days,
then increase BalanceDue by 8%.

In step 307, embodiments of the present invention attempt to identify additional context as a function of a business function or of an other financial, business, or technical operation or goal. As with all other steps of FIG. 3, embodiments of the present invention may use such additional context to refine or otherwise revise the previously identified business rule.

In our ongoing example, an embodiment of the present invention may determine that the first computer program, from which the business rule originally identified in step 201, is associated with a second application comprised by a portfolio or other type of plurality of programs. Step 305's quarterly account-closeout script QTRCLOSE, for example, might be part of an Accounts Receivable suite of financial applications used by a Retail Sales Department to process commercial customer accounts.

In such an example, an embodiment of the present invention might identify QTRCLOSE to be a component of the Retail Sales Department's Accounts Receivable suite, either by means of manually entered data or by using one or more analytical techniques known to those skilled in the art.

The embodiment may then, in step 307, use this identification to infer additional context that allows an additional constraint to be added to the previously identified business rule:
For the Retail Sales Dept.'s Commercial Accounts,
at the end of each fiscal quarter
if an account is overdue and
has been suspended for more than 90 days
then increase BalanceDue by 8%.

In step 309, embodiments of the present invention attempt to identify additional context as a function of a characteristic of a comprising or extrinsic system, platform, or other entity. Such a comprising or extrinsic system, platform, or other entity may be under control of the same entity as are one or more information sources previously considered by an embodiment of the present invention, or it may be an independent entity, such as a third-party database, a third-party Internet Web site or other Internet resource, or a public document or other public information repository.

As with all other steps of FIG. 3, embodiments of the present invention may use such additional context, and its associated context-dependent elements of information, to refine or otherwise revise a previously identified business rule.

In one example, an embodiment of the present invention may identify that the Retail Sales Department's previously identified Accounts Receivable suite of software applications is hosted on an enterprise computer system that manages an XYZ Corp.'s North American operations. This identification may be performed either by means of manually entered data or by using one or more analytical techniques known to those skilled in the art to infer information from source code, system documentation, or an other information source.

The embodiment may then, in step 309, use this identification to infer the existence of additional context that allows an additional constraint to be added to the business rule as a function of identified context-dependent elements of information associated with the additional context.

At the conclusion of this process, the business rule would read:

For XYZ Corp. NA's Retail Sales Dept.'s Commercial Accounts,
   at the end of each fiscal quarter
   if an account is overdue and
   has been suspended for more than 90 days
   then increase BalanceDue by 8%.

The running example of FIG. 3 describes a simple embodiment of FIG. 2, step 203, or of one iteration of FIG. 2, step 209, of the iterative process of FIG. 2, steps 205-209. In other embodiments, a combination of similar or analogous context-identifying steps that may comprise one or more of the steps of FIG. 3 may be performed as FIG. 2, step 203, or may be repeated with each iteration of the iterative process of FIG. 2. In such embodiments, each iteration may process one further level of context and attempt to identify one further level or generation of context-dependent elements of information, as described above.

For example, after a previous iteration of one or more of the steps of FIG. 3, an embodiment of the present invention might perform one or more of the steps of FIG. 3 a next set of times in a next iteration of the iterative process of FIG. 2 steps 205-209. Each performance of this next set of performances would attempt to identify one or more contexts of one of the contexts or context-dependent elements identified in the previous iteration. In other words, the procedure of FIG. 3 might be repeated at least one time for each context or context-dependent element identified in the previous iteration.

For example, in the iteration of steps 301-309 described above, an embodiment refined the original business rule as a function of six identified contexts and associated context-dependent elements. These refinements comprised: "if an account has been suspended," "if an account has been suspended for more than 90 days," "if an account is overdue," "at the end of each fiscal quarter," "Retail Sales Dept.'s Commercial Accounts," and "XYZ Corp. NA."

The next iteration of the iterative process of FIG. 2 steps 205-209 might then perform the method of FIG. 3, or an analogous method, six times, once for each of these six identified context-dependent elements. In a first performance of this next iteration, the embodiment might perform steps 301-309 to attempt to identify additional context for the condition "if an account is suspended," which was associated, during the prior performance of step 301, with the source code:

```
IF ACCT-SUSPENDED <= TODAY
   COMPUTE BALANCE-DUE = BALANCE-DUE * 1.08
END-IF
```

In this next performance of step 301, the embodiment might try to identify context for this source code within the same program. In this next performance of step 303, the embodiment might try to identify context for this source code as a function of the data processed by the source code. In this next performance of step 305, the embodiment might try to identify context for this source code as a function of a schedule. In this next performance of step 307, the embodiment might try to identify context for this source code as a function of a business context. In this next performance of step 309, the embodiment might try to identify context for this source code as a function of the data processed by the system context.

In some cases, this next performance of steps 301-309 will fail to identify any further context-dependent elements associated with the source code. This may occur if the information sources analyzed by the embodiment do not comprise any further context for this source code. It may also occur if all context for this source code had already been identified during one or more previous performances of steps 301-309.

A similar set of performances of steps 301-309 would be performed for each of the other five identified contextual elements. When the last iteration of steps 301-309 is complete, the method of FIG. 2 would determine whether any additional contextual elements were identified. If not, the method of FIG. 2 would end. But if additional contextual elements had been identified by any of the six sets of performances of steps 301-309, then FIG. 2 would continue with yet another iteration of steps 205-209 and of corresponding steps of FIG. 3.

If no performance of the next set of performances of steps 301-309 identify further, distinct, context-dependent elements for any context or elements identified in the previous set of performances, then no further iterations of the steps of FIG. 3 will occur, and no further iterations of the iterative loop of FIG. 2, steps 205-209, will be performed.

At the conclusion of the last iteration of the iterative process of FIG. 2, steps 205-209, the original business rule identified in step 201 will have been revised to comprise all possible context-dependent elements of information that may be inferred or extracted, directly or indirectly, from the information sources analyzed by the embodiment.

Steps 301-309 show one possible procedure for identifying context and associated context-dependent elements by analyzing an information source. These steps may be performed in an other order or in an other combination that is distinct from the order and combination shown in FIG. 3. Furthermore, combinations of other context-identifying steps are possible, depending on implementation-dependent details, wherein these other combinations may comprise one or more of the steps identified in steps 301-309 and may further comprise analogous context-identifying steps that attempt to identify context by ascribing meaning to information sources that may be associated with the business rule identified in step 201.

In some cases, one or more of these steps may comprise, all or in part, an analytical procedure or other technique known to those skilled in the art, wherein the analytical procedure or other technique allows meaning to be inferred from or otherwise identified from a structured or unstructured information source. Such procedures or techniques may be known to those skilled in arts related to the arts of compiler design, user-interface design, analytics, artificial intelligence, software engineering, or information technology.

In some embodiments, a combination of identifying steps may, for example, attempt to identify context or context-dependent elements of information associated with an identified business rule, wherein the context or elements may comprise a combination of one or more of:

- computer data or other information that is directly processed by the business rule
- computer data or other information that is indirectly or otherwise associated with the business rule or that is associated with the directly processed computer data or other information
- a condition upon the time, platform, or manner in which the business rule directly, indirectly, or otherwise processes computer data or other information
- a condition that identifies when or if the business rule is performed
- a condition upon a scope of the business rule, wherein the condition may otherwise limit a time, platform, or manner of a performance of the business rule or that may constrain a choice of entities upon which a performance of the business rule may act
- a characteristic of a referring information source that refers to the business rule, such as a calling computer program, a business-process model, or a business plan
- a condition upon the time, platform, or manner in which the referring information source is performed
- a condition upon a scope of the referring information source, wherein the condition may limit a time, platform, or manner of a performance of the referring information source or that may constrain a choice of entities upon which a performance of the referring information source may act
- an invoking rule, operation, or other logical entity that invokes the business rule, such as a function call in a computer program
- a condition that identifies when or if the invoking rule, operation, or other logical entity is performed
- a condition upon a scope of the invoking rule, operation, or other logical entity, wherein the condition may limit a time, platform, or manner of a performance of the invoking rule, operation, or other logical entity or that may constrain a choice of entities upon which a performance of the invoking rule, operation, or other logical entity may act
- an extrinsic information source, such as a computer program, Web site, business plan, or other information source distinct from the information source from which the business rule was originally inferred or extracted
- a process, function, goal, constraint, or other operational, financial, or technical requirement of a business.

Embodiments of the present invention may organize or sequence these and other methods of identifying context and context-dependent elements into embodiment-specific combinations analogous to the embodiments represented by FIG. 3, steps 301-309. An embodiment might, for example, organize context-identifying functions based on a relationship of one or more of those functions to an operation of a business rule, to a computer statement from which the business rule was inferred, to a computer program that comprises the business rule, or to one or more characteristics of one or more information sources.

Such a method of organization might also further organize context-identifying functions into the categories: "context associated with a constraint upon how, if, or when a computer program is launched," "context associated with a relationship between the business rule and an other logical entity comprised by a computer program," and "context associated with a characteristic of an extrinsic entity."

Many other ways of organizing and sequencing context-identifying steps are possible.

Regardless of the means by which an embodiment of the present invention may attempt to identify context that may be associated with an identified business rule or context-dependent elements of information that that may be associated with an identified business rule, all embodiments will attempt to identify such context or elements and, if successful, will then attempt to automatically refine the identified business rule as a function of the identified context or elements.

What is claimed is:

1. A method for automatically deriving a context of a business rule when inferring the business rule from an information source, the method comprising:

a processor of a computer system inferring the business rule as a function of a first element of information comprised by a first information source;

the processor identifying a next element of information that is associated with a first context of the first element of information, wherein the first context associates the first element with a first context-dependent characteristic of the first element, and wherein the next element of information is comprised by a next information source that is distinct from the first information source;

the processor modifying the business rule as a function of the next element of information;

the processor attempting to recognize a further element of information that is associated with a next context of the next element of information, wherein the next context associates the next element with a next context-dependent characteristic of the next element, and wherein the further element of information is comprised by a further information source that is distinct from the first information source;

the processor, if successfully recognizing the further element of information, updating the business rule as a function of the further element of information; and the processor iteratively repeating the attempting to recognize and the updating until the processor fails to recognize the further element, where the processor in each iteration initially resets values of the next element and the next information source respectively to those of the further element and the further information source that had been recognized by the processor in the previous iteration, and where the processor in each iteration attempts to recognize new values of the next context, the next context-dependent characteristic, the further element, and the further information source as functions of the reset values of the next element and the next information source.

2. The method of claim 1, wherein the next information source and the further information source are not distinct.

3. The method of claim 1, wherein the first information source, the next information source, and the further information source are each selected from the group comprising: computer-software source code; computer software logic; a specification associated with computer program code; data stored on a computer-readable medium; a description of a procedure, workflow, convention, or standard; a data structure; a data model; a business-process model; an ontology; an infrastructure description; an other description of a characteristic of a business function.

4. The method of claim 1, wherein the first information source comprises a first set of computer-program instructions, the first element of information comprises a first subset of the first set of computer-program instructions, and the next element of information is selected from the group comprising:
 a data element that is directly or indirectly processed by the first subset of the first set of computer-program instructions,
 a data element that is otherwise associated with the first subset of the first set of computer-program instructions,
 a second computer-program instruction that imposes a condition upon a time, platform, or manner of performance of the first subset of the first set of computer-program instructions,
 a second computer-program instruction that imposes a condition upon a scope of the first subset of the first set of computer-program instructions,
 a second computer-program instruction that imposes a condition upon a time, platform, or manner of performance of the first set of computer-program instructions,
 a second computer-program instruction that imposes a condition upon a scope of the first subset of the first set of computer-program instructions,
 a third set of computer-program instructions that comprises a reference to the first set of computer-program instructions,
 a second computer-program instruction that imposes a condition upon a reference to the first set of computer-program instructions,
 a second computer-program instruction that imposes a condition upon a scope of the first subset of the first set of computer-program instructions,
 a reference to an extrinsic information source that is associated with a context of the first subset of the first set of computer-program instructions;
 a business process that is associated with a context of the first subset of the first set of computer-program instructions, and
 a business goal that is associated with a context of the first subset of the first set of computer-program instructions.

5. The method of claim 1, wherein the first information source comprises a first set of computer-program instructions, the first element of information comprises a first subset of the first set of computer-program instructions, and the first context identifies an association selected from the group comprising:
 an association between a context-dependent characteristic of the business rule and an element of information comprised by the first information source;
 an association between a context-dependent characteristic of the business rule and an element of data that is directly or indirectly processed by the business rule;
 an association between a context-dependent characteristic of the business rule and a schedule that is associated with the time or frequency of performance of the business rule;
 an association between a context-dependent characteristic of the business rule and a description of a business function; and
 an association between a context-dependent characteristic of the business rule and an element of information comprised by an extrinsic information source that determines the time, platform, or manner of performance of the business rule.

6. The method of claim 1, wherein the first context and the next context are functions of a one or more contextual parameters, and wherein a contextual parameter of the one or more contextual parameters is selected from the group comprising:
 an element of information comprised by the first information source;
 an element of information comprised by the next information source;
 an element of information comprised by the further information source;
 a characteristic of an element of data associated by the business rule;
 a performance schedule associated with the business rule;
 a business function associated with the business rule; and
 a characteristic of a software application upon which a performance of a function associated with the business rule depends.

7. The method of claim 1, further comprising providing at least one support service for at least one of creating, integrating, hosting, maintaining, and deploying computer-readable program code in the computer system, wherein the computer-readable program code in combination with the computer system is configured to implement the inferring, identifying, modifying, attempting to recognize, and updating.

8. A computer program product, comprising a computer-readable hardware storage device having a computer-readable program code stored therein, said program code configured to be executed by a processor of a computer system to implement a method for automatically deriving a context of a business rule when inferring the business rule from an information source, the method comprising:
 a processor of a computer system inferring the business rule as a function of a first element of information comprised by a first information source;
 the processor identifying a next element of information that is associated with a first context of the first element of information, wherein the first context associates the first element with a first context-dependent characteristic of the first element, and wherein the next element of information is comprised by a next information source that is distinct from the first information source;
 the processor modifying the business rule as a function of the next element of information;
 the processor attempting to recognize a further element of information that is associated with a next context of the next element of information, wherein the next context associates the next element with a next context-dependent characteristic of the next element, and wherein the further element of information is comprised by a further information source that is distinct from the first information source;
 the processor, if successfully recognizing the further element of information, updating the business rule as a function of the further element of information; and
 the processor iteratively repeating the attempting to recognize and the updating until the processor fails to recognize the further element,
  where the processor in each iteration initially resets values of the next element and the next information source respectively to those of the further element and the further information source that had been recognized by the processor in the previous iteration, and where the processor in each iteration attempts to recognize new values of the next context, the next context-dependent characteristic, the further element, and the further information source as functions of the reset values of the next element and the next information source.

9. The computer program product of claim 8, wherein the next information source and the further information source are not distinct.

10. The computer program product of claim 8, wherein the first information source, the next information source, and the further information source are each selected from the group comprising: computer-software source code; computer software logic; a specification associated with computer program code; data stored on a computer-readable medium; a description of a procedure, workflow, convention, or standard; a data structure; a data model; a business-process model; an ontology; an infrastructure description; an other description of a characteristic of a business function.

11. The computer program product of claim 8, wherein the first information source comprises a first set of computer-program instructions, the first element of information comprises a first subset of the first set of computer-program instructions, and the next element of information is selected from the group comprising:
    a data element that is directly or indirectly processed by the first subset of the first set of computer-program instructions,
    a data element that is otherwise associated with the first subset of the first set of computer-program instructions,
    a second computer-program instruction that imposes a condition upon a time, platform, or manner of performance of the first subset of the first set of computer-program instructions,
    a second computer-program instruction that imposes a condition upon a scope of the first subset of the first set of computer-program instructions,
    a second computer-program instruction that imposes a condition upon a time, platform, or manner of performance of the first set of computer-program instructions,
    a second computer-program instruction that imposes a condition upon a scope of the first subset of the first set of computer-program instructions,
    a third set of computer-program instructions that comprises a reference to the first set of computer-program instructions,
    a second computer-program instruction that imposes a condition upon a reference to the first set of computer-program instructions,
    a second computer-program instruction that imposes a condition upon a scope of the first subset of the first set of computer-program instructions,
    a reference to an extrinsic information source that is associated with a context of the first subset of the first set of computer-program instructions;
    a business process that is associated with a context of the first subset of the first set of computer-program instructions, and
    a business goal that is associated with a context of the first subset of the first set of computer-program instructions.

12. The computer program product of claim 8, wherein the first information source comprises a first set of computer-program instructions, the first element of information comprises a first subset of the first set of computer-program instructions, and the first context identifies an association selected from the group comprising:
    an association between a context-dependent characteristic of the business rule and an element of information comprised by the first information source;
    an association between a context-dependent characteristic of the business rule and an element of data that is directly or indirectly processed by the business rule;
    an association between a context-dependent characteristic of the business rule and a schedule that is associated with the time or frequency of performance of the business rule;
    an association between a context-dependent characteristic of the business rule and a description of a business function; and
    an association between a context-dependent characteristic of the business rule and an element of information comprised by an extrinsic information source that determines the time, platform, or manner of performance of the business rule.

13. The computer program product of claim 8, wherein the first context and the next context are functions of a one or more contextual parameters, and wherein a contextual parameter of the one or more contextual parameters is selected from the group comprising:
    an element of information comprised by the first information source;
    an element of information comprised by the next information source;
    an element of information comprised by the further information source;
    a characteristic of an element of data associated by the business rule;
    a performance schedule associated with the business rule;
    a business function associated with the business rule; and
    a characteristic of a software application upon which a performance of a function associated with the business rule depends.

14. A computer system comprising a processor, a memory coupled to said processor, and a computer-readable hardware storage device coupled to said processor, said storage device containing program code configured to be run by said processor via the memory to implement a method for automatically deriving a context of a business rule when inferring the business rule from an information source, the method comprising:
    a processor of a computer system inferring the business rule as a function of a first element of information comprised by a first information source;
    the processor identifying a next element of information that is associated with a first context of the first element of information, wherein the first context associates the first element with a first context-dependent characteristic of the first element, and wherein the next element of information is comprised by a next information source that is distinct from the first information source;
    the processor modifying the business rule as a function of the next element of information;
    the processor attempting to recognize a further element of information that is associated with a next context of the next element of information, wherein the next context associates the next element with a next context-dependent characteristic of the next element, and wherein the further element of information is comprised by a further information source that is distinct from the first information source;

the processor, if successfully recognizing the further element of information, updating the business rule as a function of the further element of information; and the processor iteratively repeating the attempting to recognize and the updating until the processor fails to recognize the further element, where the processor in each iteration initially resets values of the next element and the next information source respectively to those of the further element and the further information source that had been recognized by the processor in the previous iteration, and where the processor in each iteration attempts to recognize new values of the next context, the next context-dependent characteristic, the further element, and the further information source as functions of the reset values of the next element and the next information source.

15. The computer system of claim 14, wherein the next information source and the further information source are not distinct.

16. The computer system of claim 14, wherein the first information source, the next information source, and the further information source are each selected from the group comprising: computer-software source code; computer software logic; a specification associated with computer program code; data stored on a computer-readable medium; a description of a procedure, workflow, convention, or standard; a data structure; a data model; a business-process model; an ontology; an infrastructure description; an other description of a characteristic of a business function.

17. The computer system of claim 14, wherein the first information source comprises a first set of computer-program instructions, the first element of information comprises a first subset of the first set of computer-program instructions, and the next element of information is selected from the group comprising:

a data element that is directly or indirectly processed by the first subset of the first set of computer-program instructions, a data element that is otherwise associated with the first subset of the first set of computer-program instructions, a second computer-program instruction that imposes a condition upon a time, platform, or manner of performance of the first subset of the first set of computer-program instructions, a second computer-program instruction that imposes a condition upon a scope of the first subset of the first set of computer-program instructions, a second computer-program instruction that imposes a condition upon a time, platform, or manner of performance of the first set of computer-program instructions, a second computer-program instruction that imposes a condition upon a scope of the first subset of the first set of computer-program instructions, a third set of computer-program instructions that comprises a reference to the first set of computer-program instructions, a second computer-program instruction that imposes a condition upon a reference to the first set of computer-program instructions, a second computer-program instruction that imposes a condition upon a scope of the first subset of the first set of computer-program instructions, a reference to an extrinsic information source that is associated with a context of the first subset of the first set of computer-program instructions;

a business process that is associated with a context of the first subset of the first set of computer-program instructions, and a business goal that is associated with a context of the first subset of the first set of computer-program instructions.

* * * * *